B. A. PARKES.
MACHINE FOR INVERTING AND BUNDLING HOSIERY.
APPLICATION FILED MAY 24, 1915.
1,169,092.
Patented Jan. 18, 1916.
5 SHEETS—SHEET 2.
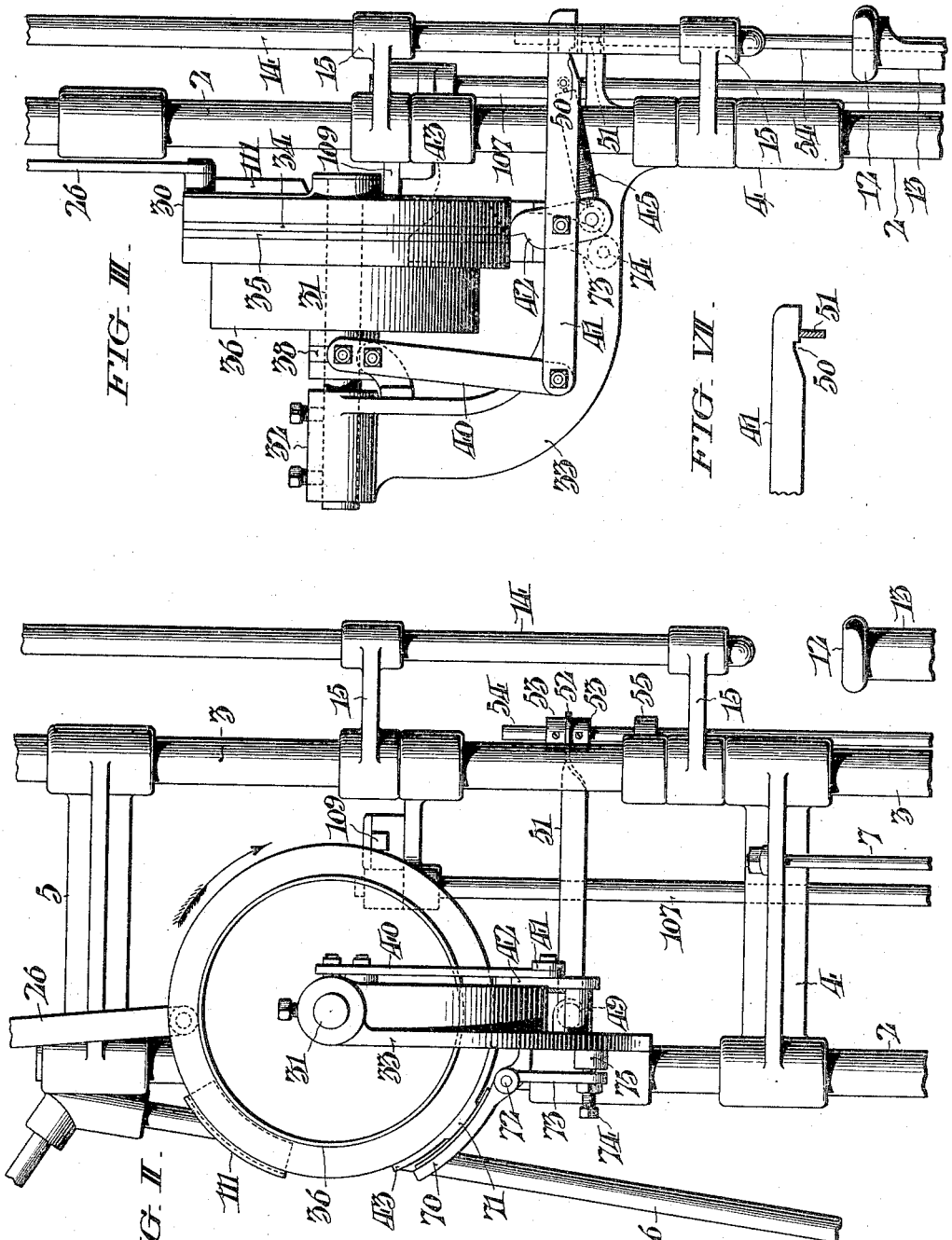

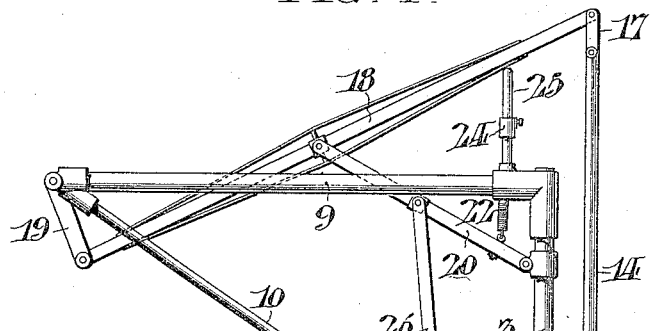

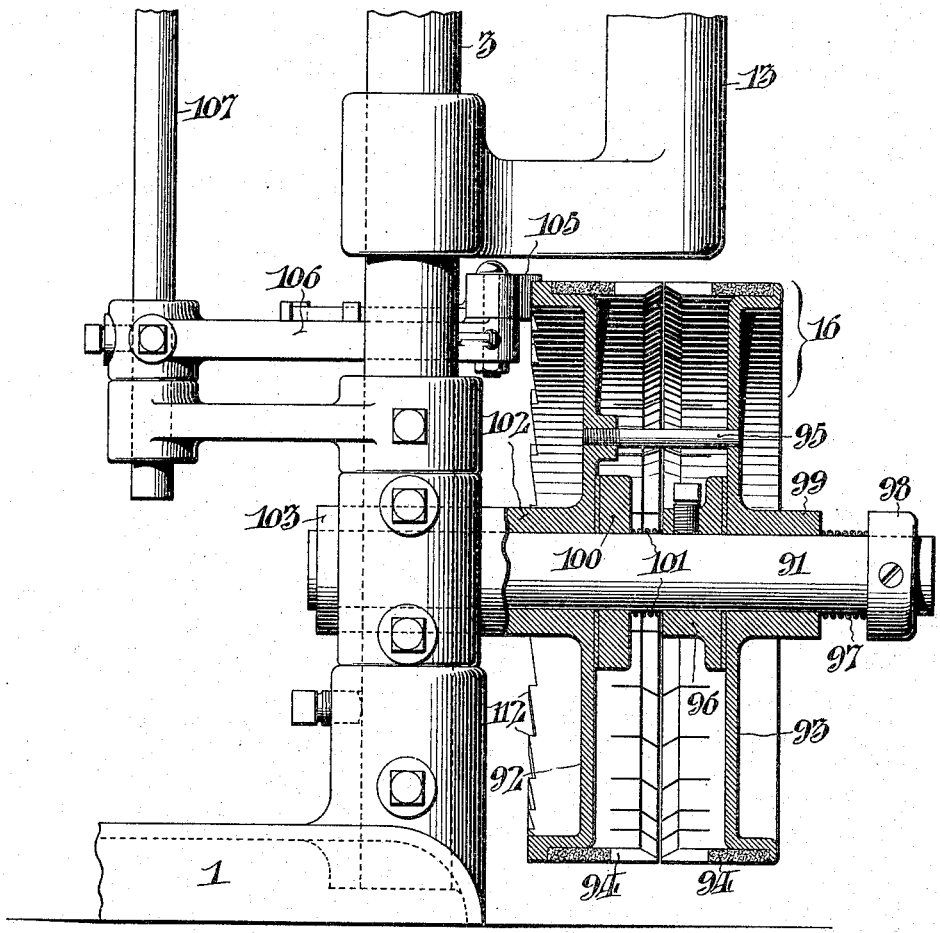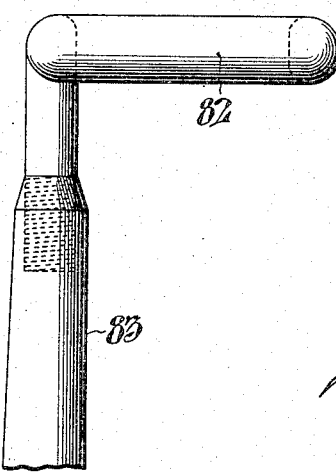

B. A. PARKES.
MACHINE FOR INVERTING AND BUNDLING HOSIERY.
APPLICATION FILED MAY 24, 1915.
1,169,092.
Patented Jan. 18, 1916.
5 SHEETS—SHEET 4.
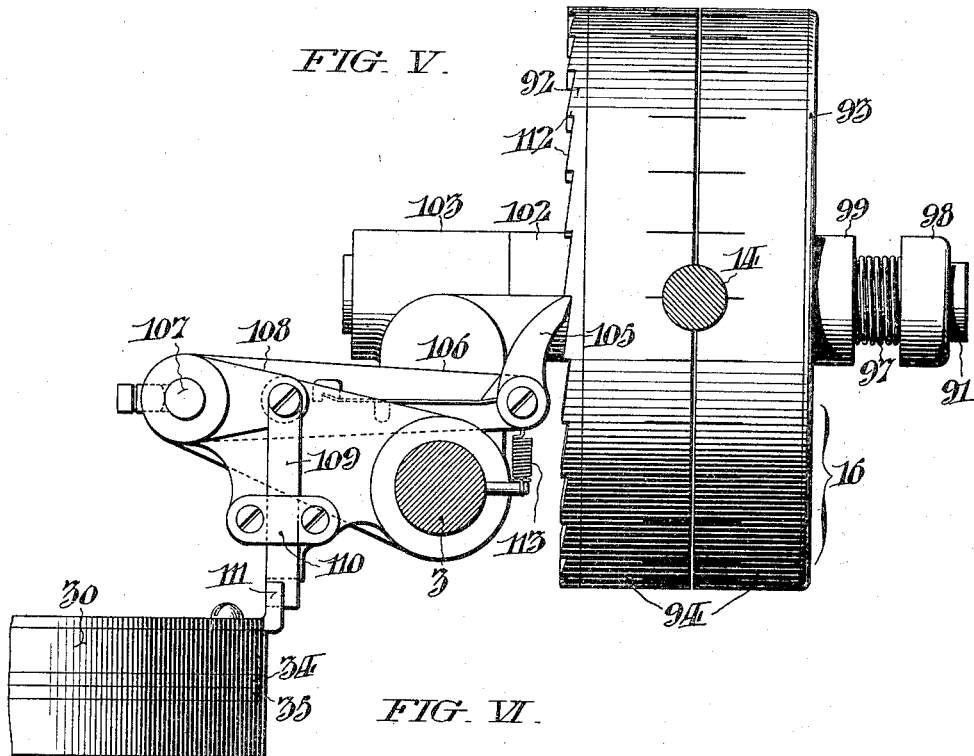
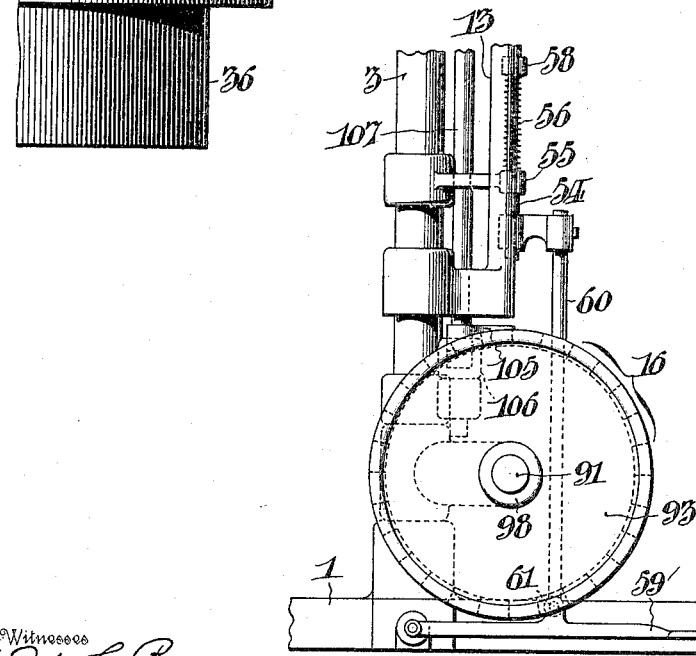

B. A. PARKES.
MACHINE FOR INVERTING AND BUNDLING HOSIERY.
APPLICATION FILED MAY 24, 1915.
1,169,092.
Patented Jan. 18, 1916.
5 SHEETS—SHEET 5.
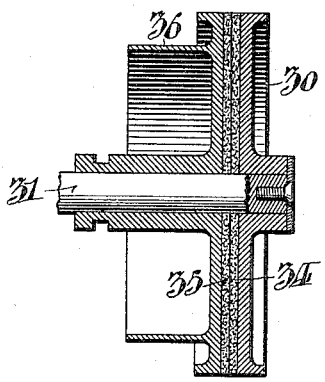
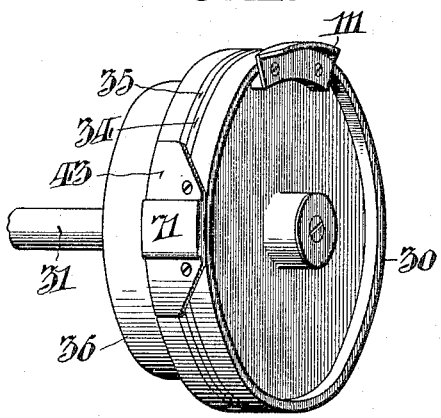
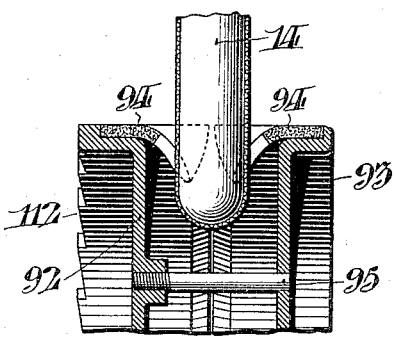
Inventor
Bertrand A. Parkes,

# UNITED STATES PATENT OFFICE.

BERTRAND A. PARKES, OF PHILADELPHIA, PENNSYLVANIA, ASSIGNOR TO THE PHILADELPHIA DRYING MACHINERY COMPANY, OF PHILADELPHIA, PENNSYLVANIA, A CORPORATION OF PENNSYLVANIA.

MACHINE FOR INVERTING AND BUNDLING HOSIERY.

1,169,092.

Specification of Letters Patent.

Patented Jan. 18, 1916.

Application filed May 24, 1915. Serial No. 30,055.

*To all whom it may concern:*

Be it known that I, BERTRAND A. PARKES, of Philadelphia, in the county of Philadelphia and State of Pennsylvania, have invented certain new and useful Improvements in Machines for Inverting and Bundling Hosiery, whereof the following is a specification, reference being had to the accompanying drawings.

My machine relates to that class of machines for inverting hosiery in which a plunger passing through a ring forces the toe of the stocking through the ring, so as to turn it inside out. Such devices are useful in connection with the finishing of hosiery.

My invention relates particularly to the mechanism by which the plunger is actuated, the operative connections for such mechanism, the support of the parts so as to maintain accurate adjustment, and includes an attachment whereby the stockings after inversion are gathered into bundles suitable for transportation.

In the accompanying drawings, I have illustrated a machine embodying my invention.

In this machine Figure I, is a side elevation. Figs. II and III, are elevational views of parts of the driving mechanism on a larger scale, the view of Fig. III being taken at right angles to that of Figs. I and II. Fig. IV, is an enlarged elevation of the bundling machine, with certain parts in section. Fig. V, is a plan view of the same, including the operative connections. Fig. VI, is an elevation of a modification of the machine, whereby a treadle is employed to actuate the plunger. Fig. VII, is a detailed view of certain connections in the operative mechanism to be hereafter described. Fig. VIII, is a sectional view, and Fig. IX, a perspective view of the frictional clutch for the actuating mechanism. Fig. X, is a detailed sectional view illustrating the operation of the bundling mechanism. Fig. XI, is an elevation on an enlarged scale of a modification of the ring through which the plunger drives the hosiery in process of inversion. Figs. XII and XIII, are views of another modified construction of such ring. Fig. XIV, illustrates a modification of the plunger tip in which the latter is provided with engaging points.

As compared with previous mechanism for accomplishing this purpose, it is a feature of my invention that all of the moving parts are supported upon a single standard so as to be held in accurate relation to each other. For this purpose upon base 1, I erect the parallel standards 2, 3, with uniting braces 4, 5. These parts are further strengthened by the stay rods 6, and 7, of which latter stay rod a twin does not appear in the drawings. To the upper extremity of the upright 3, is the cross arm 9, supported at its extremity by the brace 10. The upright 3, also supports a small table 11, serviceable to the operator of the machine. The upright 3, supports a horizontal ring 12, with depending tube 13, open at the lower end. Through this ring is driven a plunger 14, guided by the collars 15, 15, supported on the upright 3, in such a way as to drive through the ring 12, and the tube 13, carrying down with it the toe of a stocking which has been placed over the ring, and reaching to the periphery of the bundling drum 16, into contact with which the toe of the stocking is thus thrust.

The upper end of the plunger 14, is connected by link 17, with a swinging lever 18, connected at its other extremity by link 19 to the extremity of the arm 9. The fulcrum of the lever 18, obtains pivotal support on the arm 20, the other extremity of which is pivoted to the standard 3. The plunger 14, is normally held in its upper position by the pull of a coiled spring 22, which is attached at one end to the arm 20, and at the other to an adjustable collar 24, set on the upright 25, supported by the standard 3. The depression of the plunger against the tension of the spring is accomplished by the pull of an arm 26, pivoted at one end to the lever 20, and at the other end pivoted near the periphery of a drum 30, mounted on an axle 31, set in the collar 32, mounted on the bracket 33, set upon the standard 2. By means of these connections, a complete rotation of the drum 30, effects a complete reciprocation of the plunger 14.

The rotation of the drum 30, is accomplished by a friction clutch established through the contact of its side 34, with a friction disk 35, formed upon a belt driven pulley 36, which is slidably mounted upon the axle 31, and controlled by engagement of a shifting yoke 38, with a groove cut in the hub of the pulley. This yoke 38, is attached to one end of a lever 40, to the other extremity of which is pivoted a slide rod 41, which is supported centrally by a pivotal connection upon a swinging finger 42, the upper end of which is in close relation to the periphery of the drum 30, and within the effective control of a cam 43, set upon the periphery of the drum. A coiled spring 45, is attached to the slide rod 41, and by its tension tends to throw it to the left as viewed in Fig. III, establishing frictional engagement of the clutch formed by the opposing sides of the pulley 36, and the drum. When the friction clutch is engaged by contact of the drum under the tension of this spring 45, it effects the rotation of the drum with corresponding reciprocation of the plunger. But this engagement is normally prevented by connections which include a trigger mechanism which when released effects the engagement of the friction clutch, occasioning a complete reciprocation of the plunger, whereupon the trigger mechanism is reset, disengaging the clutch until the trigger mechanism is again sprung. This trigger mechanism comprises a notch 50, at the lower side of the right hand of the slide rod 41, which engages a trigger bar 51, attached at one extremity to a fixed pivot 49, while its other extremity is attached at 52, between adjustable collars 53—53, set on a trigger rod 54, which is supported with capacity for vertical sliding in ways 55, set upon the standard 3. The tension of spring 56, (Fig. I) which abuts against a collar 57, set on the trigger rod 54, normally drives the rod upward and occasions engagement of the trigger bar 51, in the notch on the slide rod 41; but a finger 58, is adjustably set upon the rod at such a distance below the ring that the hand of the operator will reach it just at the point when the stocking is drawn completely over the ring 12, but not before, and depress the rod against the tension of the spring, thereby releasing the engagement with the slide rod 41, which is thereupon moved under tension of the spring 45, to effect frictional contact between the pulley 36, and the drum 30, whereby reciprocation of the plunger immediately occurs. Instead of, or in addition to the finger 58, the lower end of the rod may be provided with an extension 60, having a pivotal connection 61, with a treadle 59, as shown in Fig. VI, so that the foot of the operator may control the depression of the plunger. When the rotation of the drum is almost complete, the cam 43, coming in contact with the upper end of the finger 42, throws the slide rod 41, to the right, in which position it is engaged by the trigger lever 51, coming in contact with the notch 50. This releases the frictional connection between the pulley 36, and the drum 30, so that a further depression of the plunger does not occur until the next positive depression of the trigger rod 54, at the will of the operator.

It will be understood that by the coöperation of the parts which have thus far been described, the operator having drawn a stocking over the ring 12, effects depression of the plunger either by the finger or foot, whereby the toe of the stocking is driven down through the sides of the stocking, accomplishing the desired inversion. This motion of the plunger does not occur until the operator is desirous that it shall. The movement is effected by connections which include the frictional contact between the pulley 36, and the drum 30. This engagement is dependent upon a yielding pressure which is regulated by the tension of the spring 45, and this may be so set as to prevent the plunger being driven with such force as would injure the hand of the operator if it should at the time be resting upon the ring 12, since the tension is so set that a comparatively slight resistance to the descent of the plunger will occasion slippage between the pulley 36, and the drum 30.

In order that the drum 30, may the more easily come to rest upon the completion of a full rotation, I have provided a brake 70, provided with a frictional lining operating upon a peripheral boss 71, formed upon the cam 43. This brake is pivoted at 72, and is provided with the depending lever arm 73, within the end of which is mounted the set screw 74, which may be adjusted against a resilient resistance block 75, of rubber or like material, so as to regulate the pressure which the brake exerts upon the drum at the time when it is desired to bring it quickly to rest. Instead of employing the tube 13, to support the ring 12, there may be substituted the ring 82, (Fig. XI) adjustably set within the upper end of a rod 83, which acts as its support, and which is in turn mounted upon the standard 3, in the same manner as is the tube 13. As a further alternative, I may employ in place of the ring 12, a collar 85, similarly mounted upon an upright 86. This collar 85, has notches cut around its perimeter, in which are set balls 87, rotating upon an axial wire 88, resting in a groove 89, around the upper edge of the collar, and held therein by the clips 90. This construction lessens the wear upon the sides of the stocking as it is driven down through the collar by the plunger, and by reducing the frictional resistance, enables the stocking to be more easily pulled down over the tube or ring.

To facilitate grouping the inverted hosiery into bundles, I provide a bundling drum 16, rotating upon an axle 91, supported in fixed horizontal relation upon the standard 3. This bundling drum comprises two disks 92, and 93, rotating alongside of each other, and provided on their peripheries with crowns 94—94, of leather or similar material, slotted around the edge and near enough to contact with each other to permit the descending plunger to thrust the toe of the stocking in between the slotted edges of the two contiguous crowns, the material yielding sufficiently to permit the plunger to pass a short distance between them, as shown in Fig. X, whereupon after retreating, the toe of the stocking is loosely caught between the two crowns, which are slowly rotating by the operation of a pawling mechanism to be described later. The disks 92, and 93, rotate in unison by reason of the engagement of a pin 95, set in one and passing freely through an aperture in the other. The disks 92, and 93, are loosely mounted upon the axle 91, the former serving as a driver for the latter. Fixedly mounted upon axle 91, between the two disks, is a collar 96, having a frictional facing adapted to be engaged by the inner face of the disk 93, under the compressive force of a spring 97, which abuts at one end against a second fixed collar 98, upon the axle 91, and at the other end against the hub 99, of the said disk 93. This manner of mounting the disk 93, permits the same to yield laterally with respect to disk 92, the requisite amount to facilitate the insertion of the plunger between the flexible crowns 94—94, of the drum.

Coöperating with the inner face of the disk 92, is a friction collar 100, which is forced into engagement with the said disk by a spring 101, which at its other end engages the fixed collar 96, already referred to. By this means, the hub 102, of the disk 92, is held against the collar 103, within which the axle 91, is secured. The disk 92, may thereby be intermittently rotated under the restrictions of this frictional contact by the mechanism which I will now describe.

The rotation of the bundling drum is effected by the operation of the pawl 105, spring pressed at the extremity of a swinging lever 106, set on a rock shaft 107, which carries an arm 108, to the end of which is pivoted slide rod 109, set in a slideway 110. The other extremity of this slide rod 109, reaches into the path of a cam 111, which is set on the rotary drum 30, and which, therefore, once for each rotation of the drum thrusts forward the slide rod 109, with accompanying pawling of the bundling drum by the contact of the pawl 105, with the ratchet 112, formed in its periphery. A spring 113, serves to keep the arm 106, normally in the retracted position shown in Fig. V. In this way a number of inverted stockings have their toes thrust successively at short intervals into the slowly rotating periphery of the bundling drum, and are thus wound around it until a sufficient number have accumulated when they are readily removed in the form of a bundle suitable for transportation. As an alternative form the plunger 14, may be provided at its end with projecting pins as illustrated in Fig. XIV, thereby affording means for positively engaging the stockings. This arrangement is particularly useful when handling stockings that have not yet been looped and which are therefore still open at the toe and liable to be unaffected by the descent of the plunger unless provided with such special means as I have described.

Having thus described my invention, I claim:

1. In a machine of the class described, the combination of a fixed ring; a plunger reciprocating in axial relation to the ring; a rotary drum; connections whereby rotation of the drum effects reciprocation of the plunger; a rotating pulley; a friction clutch, capable of engaging the pulley with the drum; and means for effecting engagement of the clutch at the will of the operator.

2. In a machine of the class described, the combination of a fixed ring; a plunger reciprocating therethrough; a drum which by its rotation effects reciprocation of the plunger; a rotary pulley capable of frictionally engaging said drum to effect reciprocation of the plunger; means for exerting fixed tension tending to effect such frictional engagement; and means opposing such frictional engagement including a trigger, which when sprung permits the engagement to take place.

3. In a machine of the class described, the combination of a ring; a plunger reciprocating therethrough; and means for actuating the plunger, including a friction clutch held in engagement under yielding pressure.

4. In a machine of the class described, the combination of a ring; a plunger reciprocating therethrough; means for effecting complete reciprocation of the plunger, said means including a clutch, a lever operatively connected therewith, adapted to throw said clutch into or out of operative position, an arm pivoted to said lever, a spring attached to said arm normally tending to throw said clutch into operative position, a trigger bar, a notch in said arm adapted to engage said trigger bar and hold said clutch out of operative position, and means for releasing said trigger bar, at the will of the operator.

5. In a machine of the class described, the combination of a ring; a plunger reciprocating therethrough; a drum for effecting reciprocation of the plunger; a rotary pulley capable of engaging said drum; a lever adapted to move said pulley into or out of engagement with said drum; an arm pivoted to said lever; a spring attached to said arm normally tending to hold said clutch in engagement with said drum; a trigger bar; a notch in said arm adapted to engage said trigger bar, whereby the action of said spring is overcome and said pulley held out of engagement with said drum; and means whereby said trigger bar is released from said notch and not reset until reciprocation of the plunger is completed.

6. In a machine of the class described, the combination of a ring, a plunger reciprocating therethrough, a drum for effecting reciprocation of said plunger, clutch mechanism for engaging said drum, a lever and an arm attached thereto, trigger mechanism tending to normally hold said clutch out of engagement with said drum but which permits it to be thrown into engagement when released, and means attached to said drum coöperating with said arm, whereby said trigger mechanism is reset after each reciprocation of the plunger.

7. In a machine of the class described, the combination of a ring; a plunger reciprocating therethrough; a drum for effecting reciprocation of the plunger; a rotary pulley capable of engaging said drum; a lever adapted to move said pulley into or out of engagement with said drum; an arm pivoted to said lever; a spring attached to said arm normally tending to hold said clutch in engagement with said drum; a trigger bar; a notch in said arm adapted to engage said trigger bar, whereby the action of said spring is overcome and said pulley held out of engagement with said drum; means for releasing said trigger bar at the will of the operator; and a finger attached to said arm, a cam on said drum, adapted to coöperate with said finger, and reset the arm, whereby said notch engages said trigger bar after each reciprocation of the plunger is completed.

8. In a machine of the class described, the combination of a ring; a plunger; means for effecting reciprocation of the plunger along the axis of the ring; means for causing intermission of such reciprocation; and a trigger finger situated a short distance below the ring by the actuation of which such intermission may be terminated and reciprocation resumed.

9. In a machine of the class described, the combination of a ring; a plunger reciprocating therethrough; a rotating drum; connections between the drum and the plunger whereby rotation of the drum effects reciprocation of the plunger; means for causing rotation of the drum to cease upon completion of reciprocation, such means including a brake provided with a frictional lining, and a boss upon said drum adapted to come in contact with said frictional lining when the reciprocation is completed.

10. In a machine of the class described, the combination of a ring; a plunger reciprocating therethrough; a bundling drum situated below the ring at a point where its periphery is reached by the plunger at the lower limit of its reciprocation; means whereby the toe of a stocking carried down by the plunger is temporarily caught by the bundling drum; and means for effecting the rotation of the bundling drum synchronously with the reciprocation of the plunger.

In testimony whereof, I have hereunto signed my name, at Philadelphia, Pennsylvania, this nineteenth day of May 1915.

BERTRAND A. PARKES.

Witnesses:
 JAMES H. BELL,
 E. L. FULLERTON.

Copies of this patent may be obtained for five cents each, by addressing the "Commissioner of Patents Washington, D. C."